United States Patent
Surma et al.

[19]

[11] Patent Number: 5,968,337
[45] Date of Patent: Oct. 19, 1999

[54] APPARATUS AND METHOD FOR CONSTANT FLOW OXIDIZING OF ORGANIC MATERIALS

[75] Inventors: Jeffrey E. Surma, Kennewick, Wash.; Norvell Nelson, Palo Alto; G. Anthony Steward, Los Altos Hills, both of Calif.; Garry H. Bryan, Kennewick, Wash.

[73] Assignees: Battelle Memorial Institute, Richland, Wash.; EOSystems, Inc., Sunnyvale, Calif.

[21] Appl. No.: 08/984,222

[22] Filed: Dec. 2, 1997

Related U.S. Application Data

[63] Continuation-in-part of application No. 08/634,662, Apr. 18, 1996, Pat. No. 5,707,508.

[51] Int. Cl.⁶ .................................................. C25F 1/461
[52] U.S. Cl. ......................... 205/688; 205/703; 205/704; 205/770; 204/252; 204/261; 204/262; 588/204
[58] Field of Search .................................. 205/688, 703, 205/704, 770; 204/252, 261, 262; 588/204

[56] References Cited

U.S. PATENT DOCUMENTS

| | | | |
|---|---|---|---|
| 3,873,580 | 3/1975 | Rennie | 260/362 |
| 4,840,749 | 6/1989 | Noriaki et al. | 260/378 |
| 4,925,540 | 5/1990 | Dhooge | 204/157.42 |
| 5,207,877 | 5/1993 | Weinberg et al. | 204/130 |

FOREIGN PATENT DOCUMENTS

| | | | |
|---|---|---|---|
| 0 246 957 | 11/1987 | European Pat. Off. . | |
| 0297738 | 8/1988 | European Pat. Off. | 9/28 |
| 92/05411 | 6/1992 | WIPO | 1/46 |
| 96/15851 | 10/1996 | WIPO . | |
| 97/00086 | 3/1997 | WIPO | 51/2 |
| 98/06727 | 4/1997 | WIPO | 1/46 |
| 98/25661 | 2/1998 | WIPO | 46/72 |

OTHER PUBLICATIONS

Scrubbing of $SO_2$ and $NO_x$ using a Ce(IV) Containing Solution: A Kinetic Investigation, M Aurousseau et al., Laboratoire des Sciences du Génie Chimique, CNRS–ENSIC, BP451, F–54001 Nancy, France, 1995 No month given.

*Primary Examiner*—Kathryn Gorgos
*Assistant Examiner*—Thomas H. Parsons
*Attorney, Agent, or Firm*—Paul W. Zimmerman

[57] ABSTRACT

The invention is a method and apparatus using high cerium concentration in the anolyte of an electrochemical cell to oxidize organic materials. The method and apparatus further use an ultrasonic mixer to enhance the oxidation rate of the organic material in the electrochemical cell. A reaction vessel provides an advantage of independent reaction temperature control and electrochemical cell temperature control. A separate or independent reaction vessel may be used without an ultrasonic mixer to oxidize gaseous phase organic materials.

42 Claims, 7 Drawing Sheets

APPARATUS AND METHOD FOR CONSTANT FLOW OXIDIZING OF ORGANIC MATERIALS

This application is a continuation-in-part of application Ser. No. 08/634,662 filed Apr. 18, 1996, now U.S. Pat. No. 5,707,508.

This invention was made with Government support under Contract DE-AC06 76RLO 1830 awarded by the U.S. Department of Energy. The Government has certain rights in the invention.

FIELD OF THE INVENTION

The present invention relates generally to an apparatus and method for oxidizing organic materials in a treatment mixture. More specifically, the invention relates to an apparatus and method using catalyzed electrochemical oxidation wherein the catalyst is a regenerative oxidant, in combination with reservoirs permitting constant flow of the treatment mixture through the electrochemical cell. As used herein, the terms "porous membrane" and "porous barrier" are interchangeable and refer to the material used in electrochemical cells that separates the anolyte from the catholyte. The material may be in any form including truly porous material as well as semi-permeable material. According to the present invention, a semi-permeable membrane is preferred.

BACKGROUND OF THE INVENTION

Many organic materials are stored and ultimately require disposal. Disposal, however, is becoming more difficult with increasing environmental regulations. In addition, conventional disposal methods, for example incineration, may create additional waste, and may create a hazard especially when the organic materials are exoenergetic materials.

Use of cerium in an electrochemical cell is taught by Silva et al. in U.S. Pat. No. 5,420,088 issued May 30, 1995. The Silva et al. process is for the purpose of recovering catalyst material from latent catalyst material solids. Oil or organic material is preferably extracted or removed from latent catalyst material solids before the latent catalyst material solids are placed into the electrochemical cell. However, organic material may be reacted in the electrochemical cell together with the latent catalyst material solids, but with a reduced efficiency of recovering catalyst material.

The destruction of cutting oils using catalyzed electrochemical oxidation technology has been studied (Surma et al. 1991) using silver (II) as the catalyst in the $HNO_3$ anolyte solution. That work indicated that near complete (>99.9%) destruction of the oil could be achieved. Optimization of the oil destruction rate by selecting operating parameters of temperature, silver concentration, and electrode current density resulted in destruction efficiencies greater than 99.9%. Operating temperatures up to about 70° C. were preferred.

Studies by Bray et al. 1989 have shown that organic compounds may be destroyed using electrochemical methods coupled with a catalytic oxidant, such as silver or cerium. However, the work indicated that cerium may not be kinetically fast enough for an industrial organic oxidation process.

The apparatus and method of the co-pending application Ser. No. 08/634,662, now U.S. Pat. No. 5,707,508 has the disadvantage of varying flow rate of the treatment mixture through the electrochemical cell. It has a further disadvantage of inadequate offgas treatment.

Others have used a catalyst/cocatalyst composition for oxidizing organic waste material to produce hydrogen. Examples include U.S. Pat. No. 4,925,540, and European Patent Application 0 246 957 A1 both to Dhooge. Another example is scrubbing of $SO_2$ and $NO_x$ using a Ce(IV) containing solution as described in the article SCRUBBING OF $SO_2$ AND $NO_X$ USING A Ce(IV) CONTAINING SOLUTION: A KINETIC INVESTIGATION, M Aurousseau, F Lapicque, The 1995 ICHEME Research Event/First European Conference V. 1562–564, 1995.

Accordingly, there is a need for a method of disposal of organic materials that is safe for both the environment and the personnel handling the organic materials, simplified compared to needing a catalyst/cocatalyst combination and which permits a steady flow rate through the electrochemical cell.

SUMMARY OF THE INVENTION

The invention is based upon the unexpected discovery that cerium electrooxidation of an organic/water/acid emulsion is specific to the organic phase of the emulsion and therefore exhibits a greater organic reaction rate than silver. Thus, the present invention is a method and apparatus using high cerium concentration in the anolyte of an electrochemical cell to oxidize organic materials. Organic materials specifically include organic liquids, for example oils, and solid combustible materials, for example paper products, plastics, rubber, cloth, tape, and wood. The invention includes the discovery that under certain conditions cerium can be at least as effective as silver in the destruction of organic materials, particularly cutting the oils. Specifically, conditions for cerium(IV) oxidation of combustible materials are at elevated temperature (i.e., >85° C.) and at increased electrocatalyst concentrations.

The use of cerium as an electrocatalyst has shown that the catalytic electrochemical oxidation process can operate continuously with only minimal electrocatalyst depletion in the anode. The only loss of cerium is due to the slow migration across the membrane into the cathode compartment. When silver is used as an electrocatalyst for Trimsol destruction, a portion of the catalyst is lost in the precipitation reaction with chloride. Also it was observed that the migration of the cerium across the membrane separating the anode for the cathode was much lower than was observed for silver.

The use of cerium as an electrocatalyst has many advantages over silver. Specifically the cerium is not subject to losses due to precipitation as a halide as is silver. Cerium is not a hazardous or listed substance which aids in the disposition of the spent anolyte. Operation of the cell using cerium also has the advantage that higher current densities can be used resulting in higher efficiency than when silver is the electrocatalyst. Other advantages with respect to the operation of the pilot-plant were also observed that make cerium the electro-catalyst of choice. Further advantages are realized because cerium is neither a listed or a hazardous compound, making a cerium based electrochemical oxidation process a more attractive alternative than incineration. Another advantage of the present invention is the unexpected result that the oxidant alone (preferably cerium), in the absence of a cocatalyst, is fully sufficient to oxidize organic materials to $CO_2$ and $H_2O$.

The method and apparatus further use an agitating emulsifier to reduce the size and increase the surface area of the organic phase and enhance the oxidation rate of the organic material in the electrochemical cell. For a stream of an organic material miscible with water or aqueous solution, the agitating emulsifier may not be needed.

A liquid phase reaction vessel is used wherein the organic phase is converted to $CO_2$ and $H_2O$ by reaction with the oxidant, and the oxidant is reduced. Reduced oxidant is then passed through the electrochemical cell for regeneration to an original oxidant state and subsequent re-use in the liquid phase reaction vessel with fresh organic phase.

In the case wherein the treatment medium is in a gas phase, an agitating emulsifier is not needed. Instead, the gas phase organic is introduced into the gas phase reaction vessel and reacted with an oxidant solution.

It is an object of the present invention to provide a method and apparatus for oxidizing organic materials in a liquid phase wherein the organic material oxidation reaction and the oxidant regeneration are in separate vessels.

It is a further object of the present invention to provide a method and apparatus for oxidizing gas phase organic materials.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

According to a preferred method of the present invention, organic materials are destroyed by (a) providing an electrochemical cell having a cathode compartment and an anode compartment separated by a porous membrane; (b) providing an oxidant in an anolyte, the oxidant that is not reactive with the aqueous solution but reactive with the organic phase; and (c) heating the mixture together with the oxidant. When the mixture is in a liquid phase, the next step is (d) emulsifying the heated mixture and increasing the surface area of the organic phase. When the mixture is in a gas phase, the next step is (d) contacting the gas phase mixture with the oxidant in a gas phase reaction vessel. In one embodiment, the next step is (e) flowing electrical current through the electrochemical cell and oxidizing the organic material in the anode compartment. In a preferred embodiment, the next steps are (e) flowing the emulsified or contacted mixture through a liquid phase reaction vessel wherein the organic material is converted to $CO_2$ and $H_2O$, and the oxidant is reduced, (f) flowing reduced oxidant through the electrochemical cell to regenerate the oxidant to an original oxidant form. In the case of cerium, cerium in an original oxidant form is $Ce^{4+}$ which upon reduction becomes $Ce^{3+}$. The $Ce^{3+}$ is regenerated in the anode of the electrochemical cell to $Ce^{4+}$ for re-use with fresh organic material.

The organic material may be any organic material, but the process of the present invention is especially useful for immiscible organic liquids, most especially exoenergetic materials including but not limited to chemical warfare agents, for example sarin ($C_4H_{10}FO_2P$), and high explosives for example HMX ($C_4H_8N_8O_8$), RDX, nitrocellulose, trinitrotoluene, and nitroglycerin. Of course any combustible organic material is exoenergetic.

The oxidant is preferably cerium. For cerium, the electrochemical cell may be operated at any temperature compatible with the anolyte solution and is preferably from about 30° C. to about 100° C. and most preferably from about 80° C. to about 100° C. The concentration of cerium is at least about 0.5M. Preferably, the cerium concentration is from about 1.0M to about 1.7M, and most preferably from about 1.5M to about 1.7M. The higher concentrations permit operation of the electrochemical cell at higher current densities and higher current efficiencies. The electrical power consumption ranges from about 4 kWh/lb to about 9 kWh/lb of the organic materials. Most organic materials can be processed at near 100% coulombic efficiency, i.e., the amount of electrical power used is very near the theoretical electrical power needed to completely oxidize the organic materials to $CO_2$ and $H_2O$ and possible inorganic acids in the anolyte.

Further efficiency is gained when the organic material is mixed in water and the mixture passed through an agitating emulsifier. The agitating emulsifier provides a more thorough mixing and more even distribution of the organic material in the water. In solution, the agitating emulsifier serves to completely homogenize the organic material water mixture. In a 2-phase mixture, the agitating emulsifier breaks the organic material phase into smaller "bubbles" thereby emulsifying the mixture and increasing its surface area. Whether in solution or multi-phase mixture, the agitating emulsifier improves the physical properties of the mixture for better contact to the electrodes. The agitating emulsifier may be any agitating emulsifier including but not limited to ultrasonic vibrator, and high speed propeller.

In addition, further efficiency may be realized by vibrating the electrodes and increasing the mass/charge transfer coefficient between the liquid and the electrodes.

Figure 1:
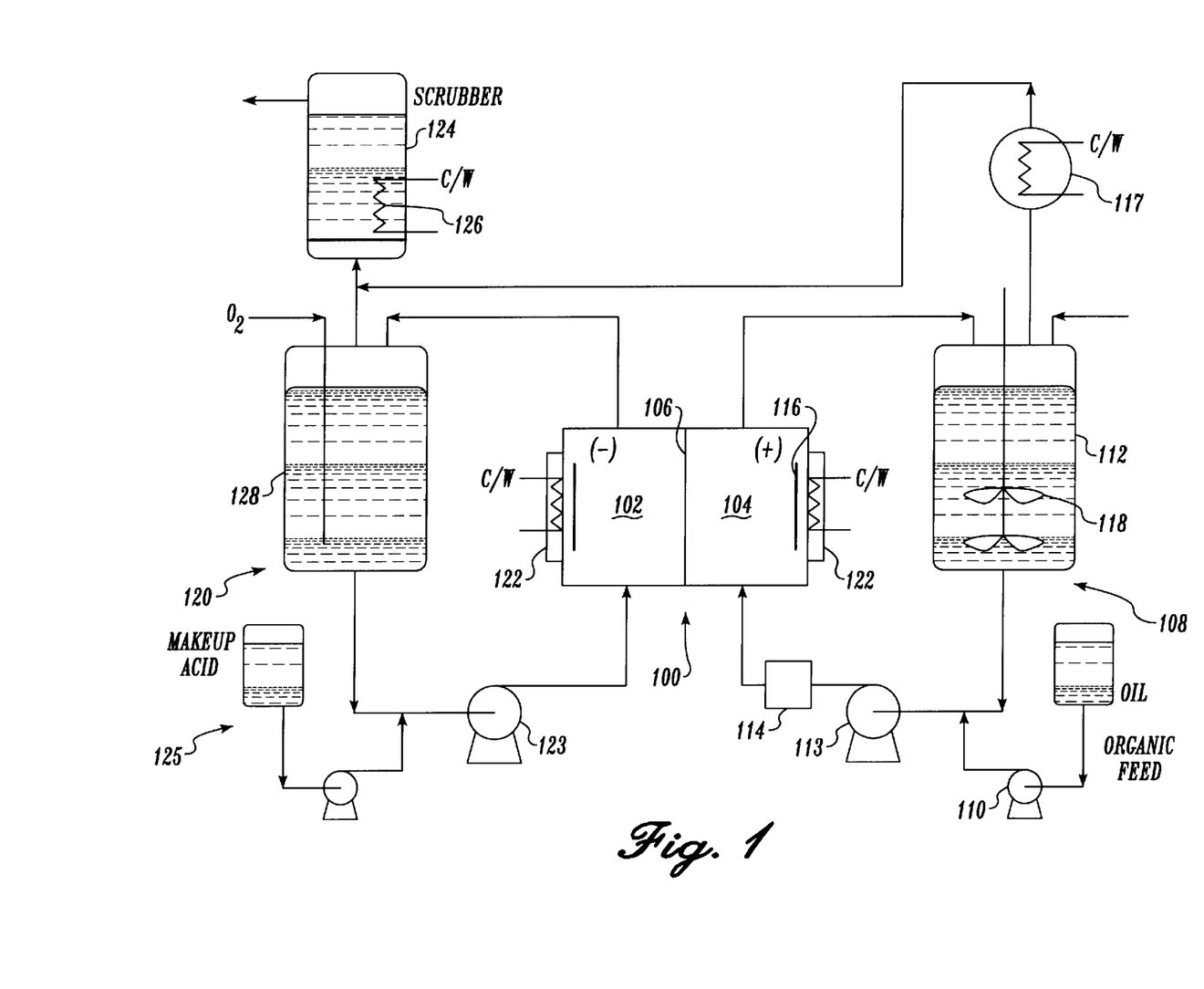
FIG. 1 is a schematic diagram of the apparatus of the present invention.

An apparatus of the present inventions is shown in FIG. 1. The electrochemical cell 100 has a cathode compartment 102 and an anode compartment 104 separated by a porous membrane 106. The electrochemical cell 100 is filled with a solution of cerium in a concentration of at least about 1M. in an anolyte. Because the cerium is generally present as a cerous ion, Ce(III), it is oxidized to ceric ion, Ce(IV) in the anode compartment. The ceric ion reacts with the organic material to destroy it. Electrical current flowing through said electrochemical cell provides the energy to re-oxidize cerous ions in the anode compartment 104. The feed may consist of a liquid organic fed into the anolyte loop 108 with a metering pump 110. Alternatively, solids such as paper pulp and wood chips could be introduced into the anolyte loop via a screened cage (not shown) in the anolyte tank 112.

The anolyte solution is pumped (pump 113) through the anolyte loop 108 having of an agitating emulsifier 114. The agitating emulsifier 114 serves to increase the organic surface area for faster oxidation rates and may provide 100 to 5000 watts or more of energy to the anolyte/organic solution. After emulsification, the solution enters the electrochemical cell anode compartment 104, where the metal catalyst is oxidized (e.g., $Ce^{3+}$ to $Ce^{4+}$). Cerium(IV) is a kinetically rapid, powerful oxidizing agent, which is reduced by reacting with and oxidizing organic molecules. After the cerium(IV) is reduced, it again is oxidized in the electrochemical cell 100. In this cyclic manner, cerium acts as an oxidation catalyst, carrying electrons from the material being oxidized to the anode 116. After the electro-chemical cell 100, the anolyte solution enters the anolyte tank 112, which not only serves as a gas/liquid separator and surge tank, but also provides the capability for the oxidation of solids. Gases exiting the anolyte tank 112 pass through a condenser 117. The anolyte tank 112 is provided with an agitator 118 to promote mass transfer if oxidation of solids is evaluated. Temperature, pressure, density, and flowrate of the anolyte and catholyte loops 108, 120 are measured.

The cell temperature of the anode and cathode can be independently maintained through heat exchange to fluid jackets 122 on the outside of the electrochemical cell 100. Operating temperatures of the anolyte may range from about 20° C. to about 100° C., but are preferably between about 30° C. and about 100° C., and most preferably from about 80° C. to about 100° C. Operating pressure is preferably ambient pressure of about 1 atmosphere. Heating may be done separately, or as a result of passing electrical current through the electrochemical cell. Although the catholyte may be about the same temperature as the anolyte, it is preferred to maintain the catholyte at a lower temperature than the anolyte to reduce generation of gaseous nitrous oxide(s) ($NO_x$). The catholyte may be cooled to just above a freezing temperature of the catholyte. Preferably, catholyte temperature is maintained at about 25° C. to about 70° C. which is approximately 30° C. cooler than the anolyte.

The catholyte loop 120 is separated from the anolyte loop 108 with a porous barrier 106 chosen to minimize mixing while maintaining electrical conductivity. The catholyte pump 123 moves catholyte through the catholyte loop 120. The main chemical reaction in the catholyte loop 120 is the reduction of nitric acid to $HNO_2$, which is reoxidized in part by bubbling $O_2$ through the solution from the catholyte tank. Make up acid (acid addition unit 125) is added to the catholyte loop 120 to maintain the acid concentration. The acid is an inorganic acid in which cerium is soluble. Preferably, the acid is nitric acid which has a high solubility for cerium. Other acids include sulfuric acid and hydrochloric acid.

The evolved gases from the anolyte and catholyte tanks 112, 128 are evacuated to the atmosphere after $NO_x$ removal. A gas proportioner (not shown) optionally allows controlled mixing of $NO_x$ from the catholyte off-gas and $O_2$ from the anolyte off-gas. Optionally, the evolved gases may be passed through a reaction vessel (not shown), where the gas phase catalytic oxidation of NO to $NO_2$ takes place. Because $NO_2$ is absorbed faster by water than NO, this reaction greatly enhances the efficiency of the $NO_x$ scrubber 124. After exiting the $NO_x$ scrubber 124, the gas is exhausted to the atmosphere. Scrubber temperature is maintained by a cooling coil 126 running through the scrubber 124.

Data Acquisition for Examples

A 386 computer was used with AIMAX-PLUS data acquisition and control software to control the process with minimal operator oversight. Measured parameters were automatically recorded, and the computer had direct control over four final control elements. The anolyte and catholyte temperatures were controlled by motor-operated valves which opened or closed to maintain the anolyte and catholyte temperature set points. A third motor-operated valve minimized the differential pressure between the anolyte and catholyte loops. (In the past, a build-up of pressure in one of the loops had caused the membrane to rupture.) The fourth, and final, control element was the speed of the makeup $HNO_3$ metering pump. Additions of $HNO_3$ maintained acid concentrations at set point and prevented $H_2$ generation. All of the final control elements were controlled via a 4 to 20 milliamp signal generated from the computer.

During normal operation, the computer displays a process diagram by which the operator monitors control parameters. All measured parameters can be displayed on the process diagram and provide the operator with real time measurements. In addition to monitoring parameters, the control system provides the operator with manual control of the anolyte and catholyte pumps, the power supply voltage and amperage, and the capability to override all final control elements from the computer.

EXAMPLE 1

An experiment was conducted to compare organic phase destruction in an electrochemical cell with cerium or silver, and with or without emulsification. In this experiment, the agitating emulsifier was an ultrasonic mixer Model 800D, Heat Systems-Ultrasonics, Farmingdale, N.Y. Because the oxidation potential for silver (II) is about 1.98 volts and for cerium (IV) is about 1.64 volts, it was expected and silver would outperform cerium. The organic material was Trimsol cutting oil.

For tests without emulsification, the organic phase was not effectively destroyed. It was observed that little or no detectable oxidation of an immiscible organic liquid occurred without the use of the ultrasonic mixing. It was also observed that when the operation of the ultrasonic emulsification system was inadvertently interrupted, the oxidation rate of the organic phase would drop quickly.

For tests with emulsification, the results are shown in Table E-1

TABLE E-1

Organic Destruction Rate

| Oxidant | Temperature (C.) | Amount of Organic Phase | Organic Destruction Rate (g/hr) |
|---|---|---|---|
| Silver (II) | 70 | 20 ml batch | 24 |
| Cerium (IV) | 95 | 10 ml batch | 24 |
| Cerium (IV) | 85 | 10 ml batch | 6.24 |
| Cerium (IV) | 80 | 10 ml batch | 0.4 |
| Silver (II) | 70 | 118 ml continuous | 51 |
| Cerium (IV) | 95 | 116 ml continuous | 60 |

The cerium organic destruction rate is strongly affected by temperature. The silver is shown only for 70° C. because above 70° C., the silver causes water separation and release of oxygen. Tests above 70° C. were attempted and only reached as high as about 85° C. beyond which the oxygen generation from the aqueous solution overwhelmed the test. The organic destruction rate is also a function of the amount or concentration of organic phase present and is less for decreasing amounts of organic phase. Thus, the fact that cerium has a destruction rate for 10 ml of organic phase equal to the destruction rate for silver starting with 20 ml of organic phase illustrates the improved destruction rate of cerium over silver. In the continuous operation tests, the cerium shows a higher destruction rate than silver both operated at optimal operating temperatures. Although cerium does not appreciably react with the aqueous solution at elevated temperatures, it is preferable to avoid boiling the aqueous solution.

EXAMPLE 2

An experiment was performed to demonstrate destruction of sarin ($C_4H_{10}FO_2P$). For sarin in water, destruction to phosphoric acid, hydrogen fluoride and carbon dioxide requires 26 faradays of charge per mole of sarin or about 5 kWh/lb of sarin. The electrochemical cell 100 was operated between 40° C. and 60° C. at ambient pressure. Silver concentration was about 0.5M.

By analyzing the off-gas, it was calculated that the destruction efficiency was better than 99.9999%. Hence, for sarin, it does not appear that using cerium offered any improvement in destruction efficiency compared to silver.

EXAMPLE 3

An experiment was conducted to demonstrate the destruction of OTTO Fuel II according to the present invention. The elemental analysis for OTTO Fuel II was 32.50 wt % Carbon 5.22 wt % Hydrogen 12.87 wt % Nitrogen 49.41 wt % Oxygen.

Two tests were conducted: 1) a baseline or control, without electrochemical oxidation, and 2) with electrochemical oxidation. The operating conditions were identical for both tests, except for the baseline test wherein no current was passed. Both tests were conducted using silver and cerium as the oxidant to compare destruction performance between silver and cerium.

Operating conditions for silver were:

Electro-catalyst Temperature 50° C.

4 M $HNO_3$/0.5 M silver initial conc OTTO Fuel≈1000 ppm

The destruction rate of OTTO Fuel by silver in terms of total organic carbon (TOC) was ~0.004–0.020 ppm TOC per coulomb charge passed through cell.

Operating conditions for cerium were:

Electro-Catalyst Temperature 75° C.

4 M $HNO_3$/1.5 M cerium initial conc OTTO Fuel≈2600 ppm

The destruction rate of OTTO fuel by cerium in terms of total organic carbon (TOC) was ~0.025 ppm TOC per coulomb charge passed through cell. This represents an unexpected increase in destruction rate using cerium compared to silver of at least 25% and as much as a factor of 6.

The electrochemical cell was operated with and without ultrasonic vibration and no difference in destruction performance was observed. This was expected because the concentration of OTTO Fuel in 4M nitric acid was near its solubility limit and therefore the OTTO fuel was in solution. The electrochemical cell with cerium was operated for about 2 hours which resulted in 28% of the total organic carbon destroyed. Had the experiment been operated to completion, it is estimated that complete destruction would have occurred in about 7 hours under these conditions.

EXAMPLE 4

Experiments were conducted to demonstrate the destruction of a cutting oil, specifically Trimsol cutting oil.

Experiments were conducted in a catalyzed electrochemical oxidation system as described above and shown in FIG. 1.

The first seven experiments were conducted to determine optimum operating conditions for the oxidation of Trimsol cutting oil. Table E-4 lists the conditions for these seven tests.

TABLE E-4

Operating Conditions for Parametric Study Using Cerium (IV) as the Electrocatalyst at a concentration of 1.5 M/L

| Run Identitication | Current Density Amperes/m2 | Temperature (° C.) |
|---|---|---|
| Run 1 | 3750 | 80 |
| Run 2 | 2500 | 80 |
| Run 3 | 5000 | 90 |
| Run 4 | 5000 | 80 |
| Run 5 | 2500 | 97 |
| Run 6 | 2500 | 85 |
| Run 7 | 3750 | 95 |

Figure 2:
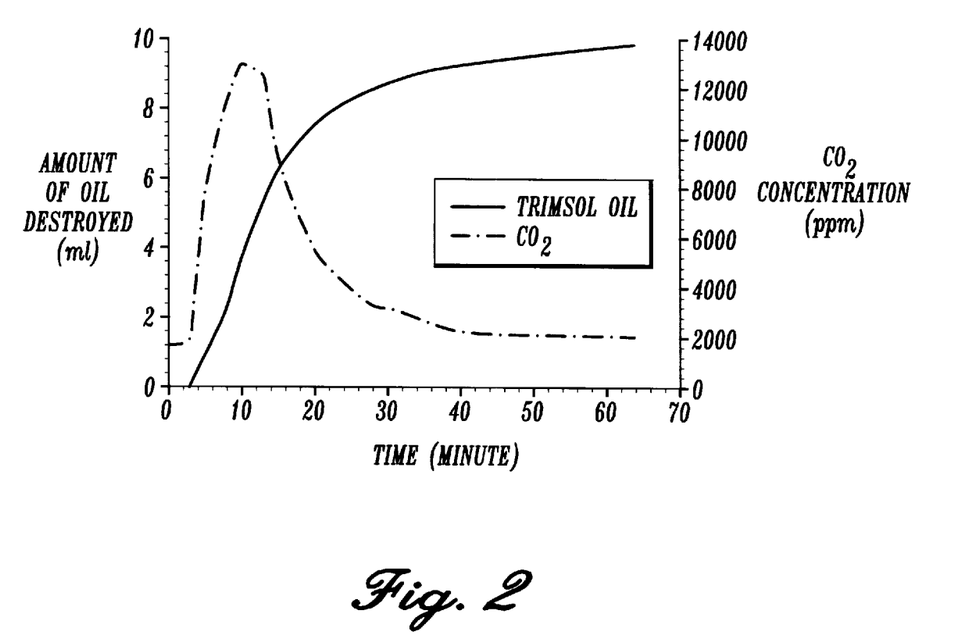
FIG. 2 is a graph of amount of oil destroyed and $CO_2$ concentration in the apparatus as a function of time.
Figure 3:
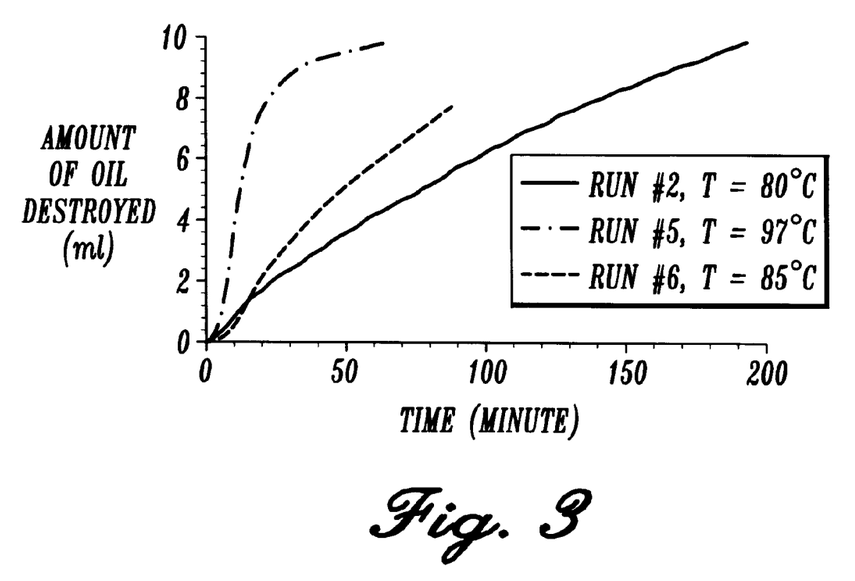
FIG. 3 is a graph of amount of oil destroyed versus time for various operating temperatures.
Figure 4:
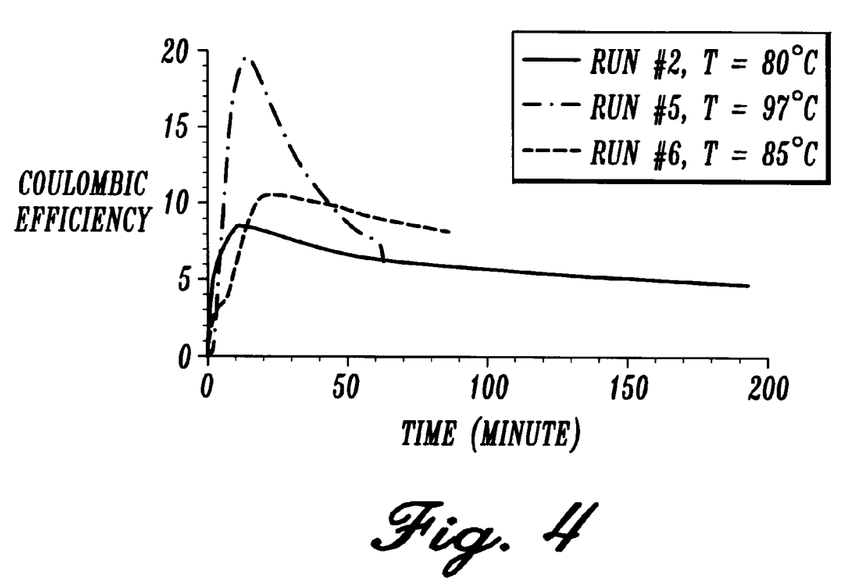
FIG. 4 is a graph of coulombic efficiency versus time for various operating temperatures.

All seven tests involved the oxidation of 10 ml of Trimsol oil. The Trimsol oil was fed continuously for 10 minutes at a feed rate of 1 m./min. After feeding was terminated, the system operated until the evolution of $CO_2$ from the anode compartment approached the baseline prior to the injection of the oil. FIG. 2 presents the data from run 5 showing nearly complete destruction of the Trimsol oil in about an hour. FIG. 3 shows the effect of temperature on destruction rate and FIG. 4 shows the effect of temperature on coulombic efficiency. This presentation of data for this run is typical of all subsequent runs in that $CO_2$ concentration data is present with a calculated value of oil destroyed, and data on the overall efficiency of destruction and coulombic efficiency are presented. The sharp increase in $CO_2$ concentration in FIG. 4 at about 10 minutes corresponds to the initial oxidation rate of Trimsol oil which is relatively high. The oxidation rate decreases as the concentration of oil decreases in the anolyte solution. The data show a strong correlation of oxidation rate to the temperature of the anolyte solution. This is evident in the columbic efficiencies presented for each of the runs. In general it is seen that higher coulombic efficiencies are obtained when the cell is operated at elevated temperatures (i.e., above 90° C.). There is an exception to this trend in runs 3 and 4 because the cell operated at higher current densities, resulting in inefficiencies caused by side reactions at the anode surface (i.e., the oxidation of water, $H_2O \rightarrow e- + H^+ + O_2$).

Figure 5:
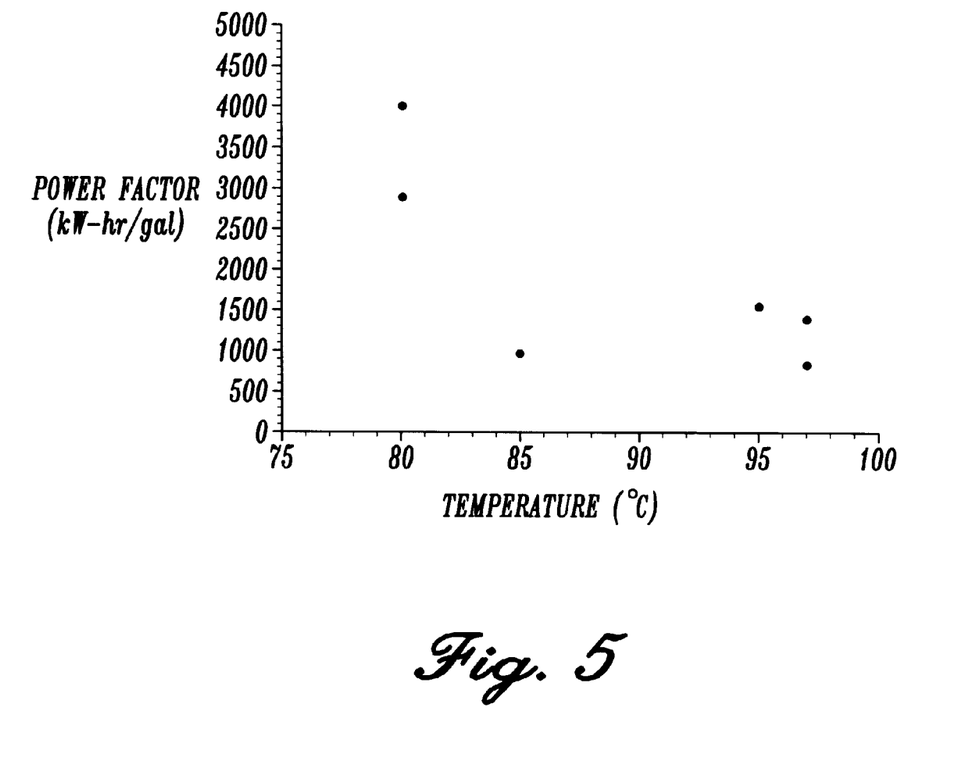
FIG. 5 is a graph of power factor as a function of temperature.

A summary of power factor versus temperature is presented in FIG. 5. It is shown that operation of the CEO process above 90° C. is required to obtain reasonable and cost effective performance with respect to the oxidation of Trimsol cutting oil.

Under these conditions power requirements for the oxidation of Trimsol cutting oil was observed to the 205 kWh per gallon of cutting oil destroyed. This corresponds to a cost in the range of $6.00 to $10.00 per gallon processed.

EXAMPLE 5

Three additional tests were performed to evaluate the performance of the pilot plant under continuous operations. More specifically, the tests were to determine the steady state destruction rate achievable under differing operating conditions. The primary operating parameter of interest was the concentration of cutting oil in the anolyte compartment. A summary of the runs is presented in Table E-5.

Figure 6:
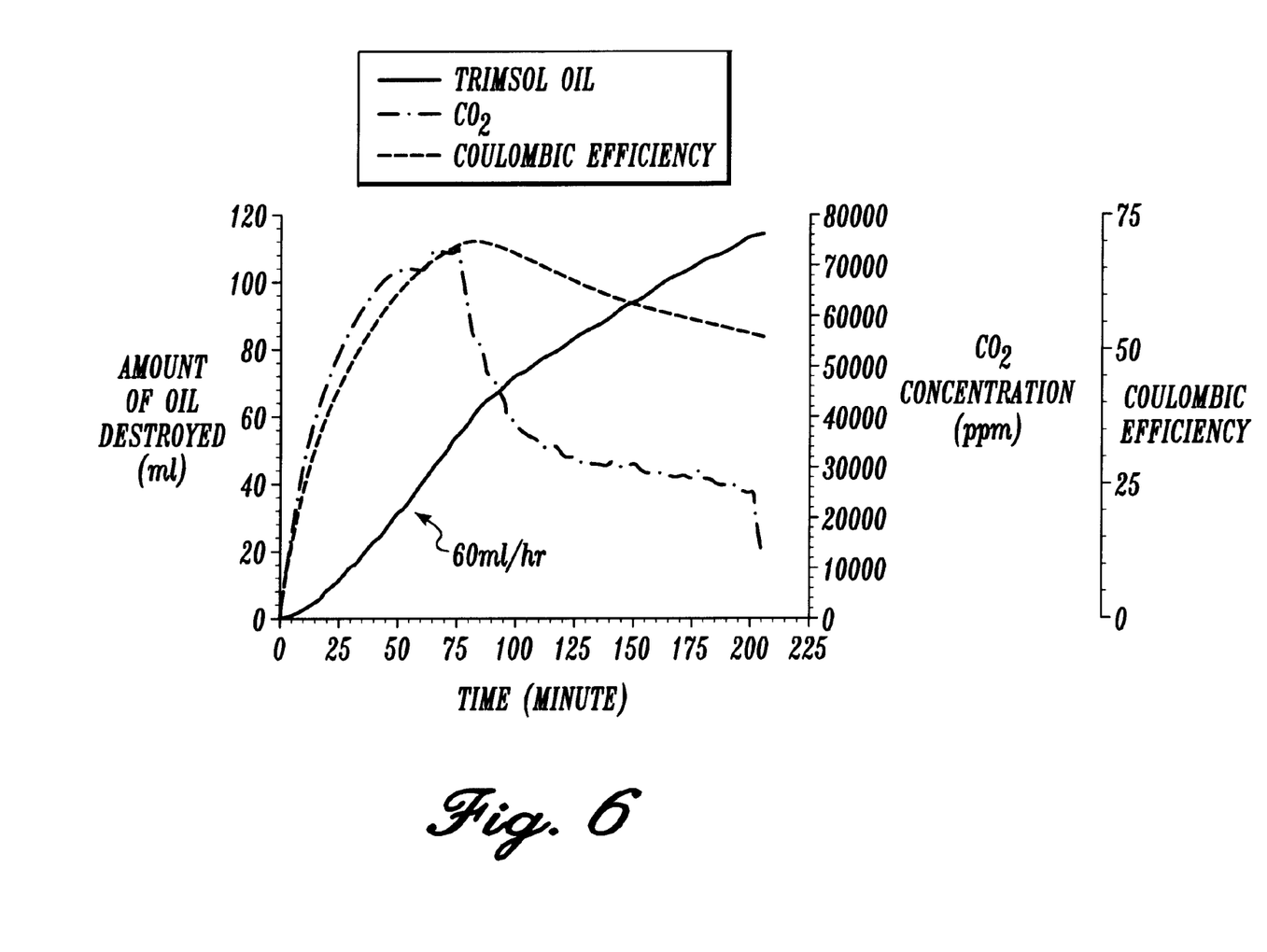
FIG. 6 is a graph of amount of oil destroyed, $CO_2$ concentration and coulombic efficiency as a function of time for Example 5.

The data from run 8 is shown in FIG. 6. It was observed that as the concentration of oil in the anolyte increased a steady state oxidation rate of 60 ml/hour was achieved during run 8. The coulombic efficiency is much higher than in runs 1 through 7 because of the much higher concentration of oil in the anolyte in run 8 relative to the prior runs.

In run 9 data shows that a steady state oil destruction rate was also achieved, evidenced by the flatting of the CO2 concentration curve, and the destruction rate was very close to that of Run 8.

TABLE E-5

Operating Conditions for Continuous Operation Pilot Plant

|  | Run 8 | Run 9 | Run 10 |
|---|---|---|---|
| Current Density (ampere/m$^2$) | 3750 | 2500 | 2500 |
| Temperature (° C.) | 95 | 95 | 95 |
| Oil Feed Rate (ml/min) | 1.8 | 4.0 | 1.0–4.0 |
| Cerium Concentration (moles/liter) | 1.5 | 1.0 | 1.5 |
| Duration of Test (hours) | 3 | 5 | 8 |
| Total Oil Fed (ml) | 115.42 | 507 | 500 |

Throughout the duration of Run 9, the feed rate of the oil into the anolyte compartment was altered. However, the average rate was very near that of run 8; therefore, steady state conditions were anticipated to be nearly the same for the two runs. During periods when the feed rate was increased to 4 m./minute, steady state oil destruction rates of 80 ml/hour were observed. It is anticipated that higher rates are achievable by further increasing the organic (oil) concentration in the anolyte.

Second Embodiment

Figure 7A:
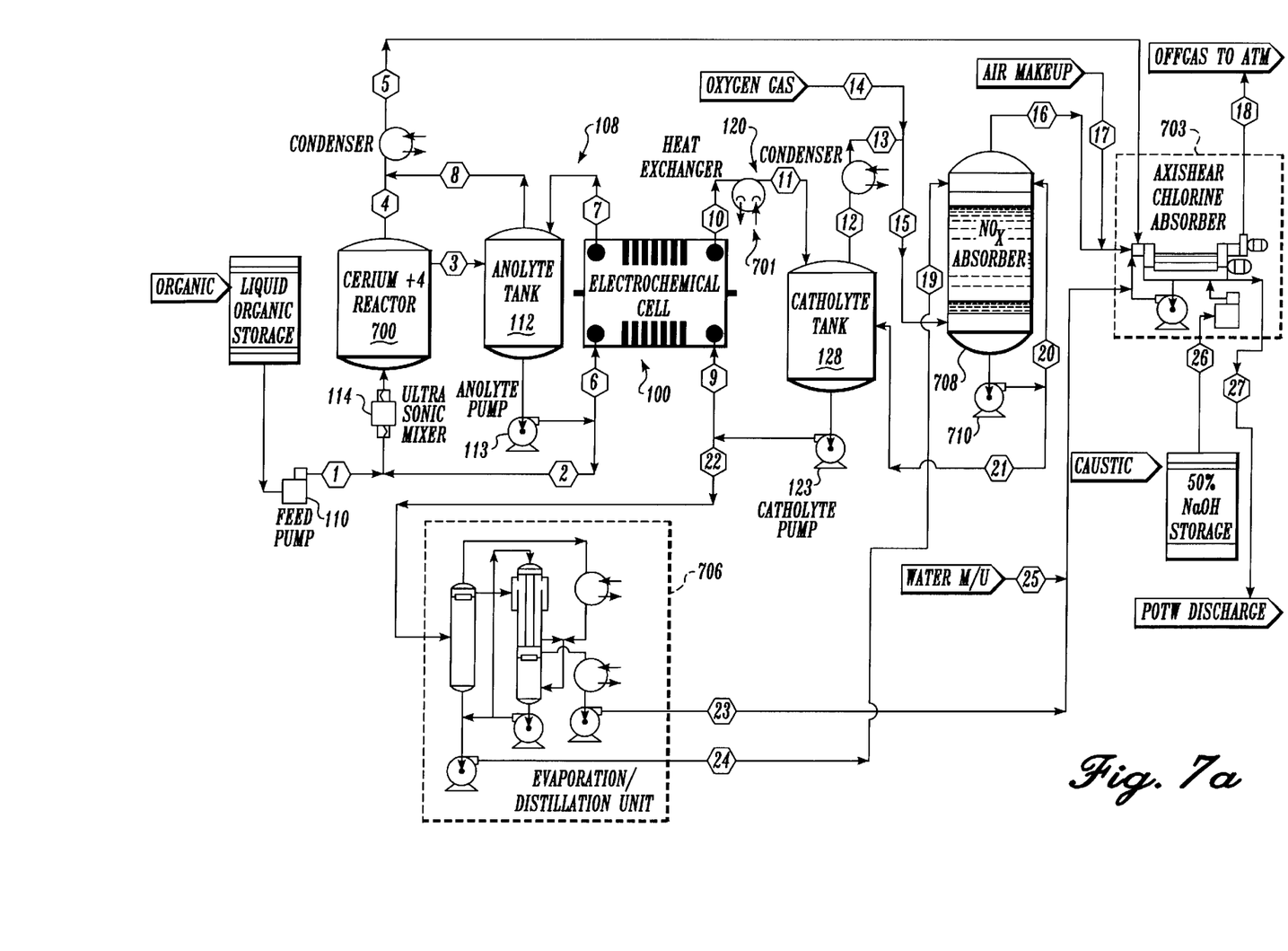
FIG. 7a is a process flow diagram including a reaction tank separate from the anolyte tank and electrochemical cell.
Figure 7H:
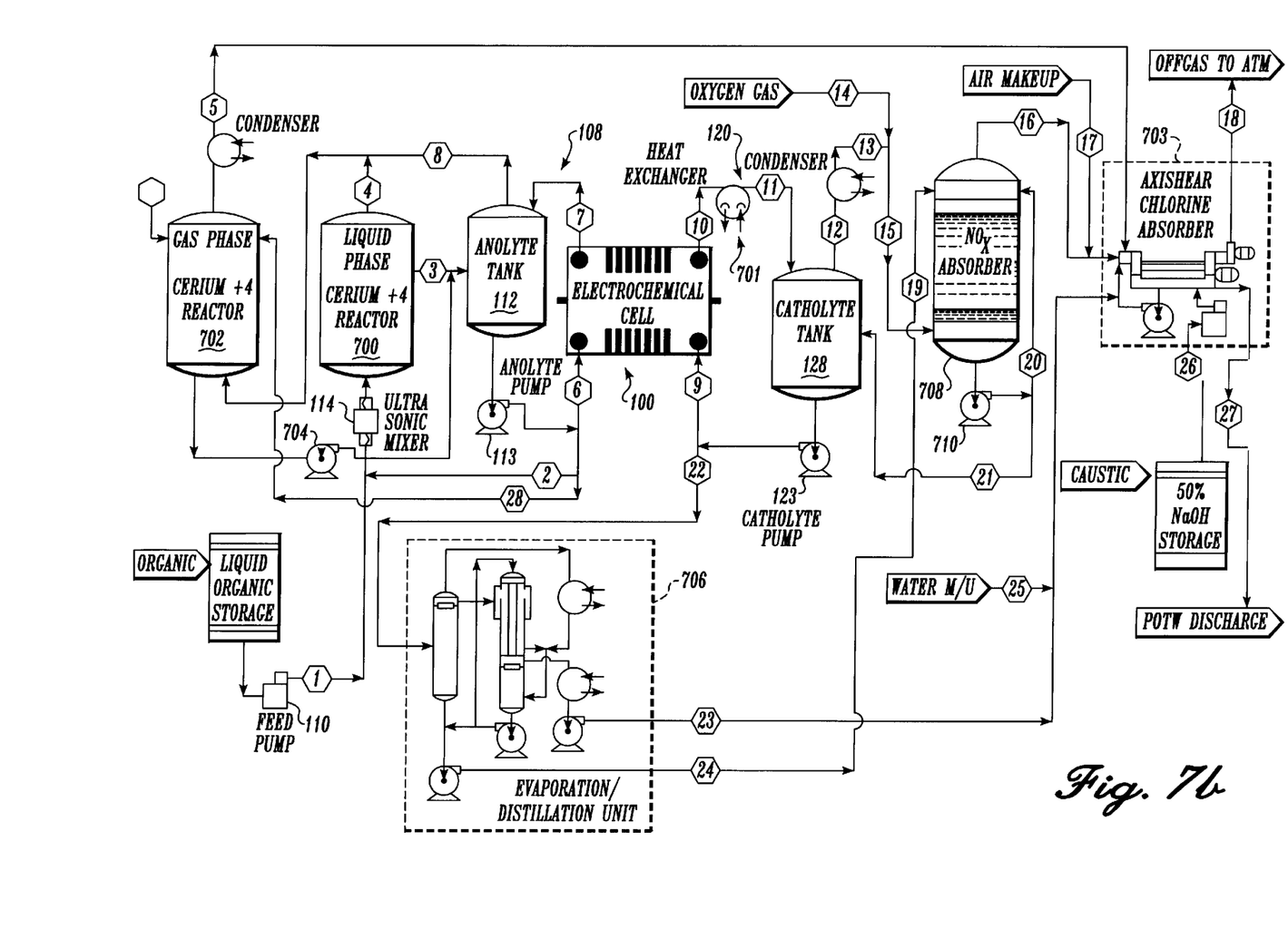
FIG. 7b is a process flow diagram further including a second reaction tank for off gas.

Another apparatus is shown in FIG. 7a. Components common to the apparatus of FIG. 1 include the electrochemical cell 100, anolyte loop 108, anolyte tank 112, anolyte pump 113, ultrasonic mixer 114, catholyte loop 120, catholyte pump 123, and the catholyte tank 128. Also common is the organic feed or storage and the feed pump 110. The main new component is the reactor tank 700. The mixer 114 receives organic material and anolyte, mixes them as a reaction mixture and passes the reaction mixture to the reactor tank 700 wherein the organic material reacts with the anolyte converting the organic material to $CO_2$ and $H_2O$ and reducing the oxidant in the anolyte. The reaction mixture is heated to increase reaction rate and reaction completeness. Heating may be done with a heat exchanger (not shown) within the reaction tank or by an external jacket (not shown). Additionally, heating may be via electrical resistance losses through the electrochemical cell. For electrochemical cells with one or a few plates receiving electrical current, an external jacket is preferred. For electrochemical cells with more plates receiving electrical current, the external jacket is not needed and electrical resistance loss provides sufficient thermal energy for the heating. A surplus of thermal energy may be provided necessitating the use of a heat exchanger 701 for removal of surplus thermal energy.

The gas ($CO_2$ and $H_2O$ vapor) is drawn off the top of the reactor tank 700 and directed to a chlorine absorber 703. Chlorine producing materials or compounds, for example organochlorine, release the carbon bound chlorine as molecular chlorine $Cl_2$ which must be removed from the offgas prior to release of the offgas to atmosphere. Hence, the chlorine absorber 703 is included. The liquid containing reduced oxidant flows back to the anolyte tank and mixed with fresh anolyte. The anolyte mixture is divided between the electrochemical cell 100 and the mixer 114. The portion going to the electrochemical cell 100 is oxidized and thereby refreshed or regenerated, for example $Ce^{3+}$ is oxidized to $Ce^{4+}$, and passed back into the anolyte tank 112. An advantage of this embodiment is that the flow through the electrochemical cell may be maintained at a substantially constant rate and the amount of electrical current through the electrochemical cell varied with reduced oxidant concentration, thereby permitting a more energy efficient process. Another advantage is that the reaction temperature control is independent of the electrochemical cell temperature control.

A variation of this embodiment (FIG. 7b) is the addition of a second reaction tank 702 for handling the gas phase organic materials and off-gas from the liquid phase reaction in the reaction tank 700. In the second reaction tank 702, the liquid anolyte is introduced at the top and sprayed into the second reaction tank 702 and the spray droplets fall by gravity. The gas is introduced at the bottom and passes through a packed bed for distribution of the gas across the cross section of the second reaction tank 702. Recovered spray droplet liquid is drained from the bottom and pumped back to the anolyte tank 112 with recovery pump 704. Alternatively, the gas phase organic materials may be handled independently of any liquid phase organic material. In this alternative embodiment, the emulsifier 114 and the liquid phase reaction vessel 700 are omitted.

The catholyte loop 120 is essentially the same as in the embodiment in FIG. 1. A catholyte regenerator 706 is added to regenerate the catholyte. With nitric acid as the catholyte, the catholyte regenerator 706 is a nitric acid distillation apparatus, for example a 2-stage vacuum evaporator designed and built by Rosenblad Design Group, Leonardo, N.J. A $NO_x$ absorber 708 is added to remove $NO_x$ from the off gases, for example a countercurrent packed bed reactor (similar in design to the second reaction tank 702) in which an upward flowing stream of $NO_x$ and $O_2$ is contacted with a downward flowing liquid of water and nitric acid. The $NO_x$ is converted to nitric acid which is recycled to the process via recycle pump 710.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of destroying a treatment mixture of an organic phase in an aqueous solution, wherein said organic phase is converted to $CO_2$ and $H_2O$, comprising the steps of:

(a) providing an electrochemical cell having a cathode compartment with a catholyte and an anode compartment separated by a porous membrane;

(b) providing an electrolyte solution of an acid selected from the group consisting of nitric acid and sulfuric acid with an oxidant in an original oxidant state that is substantially non-reactive with the aqueous solution at an operating temperature above about 70° C. in an anolyte within said anode compartment;

(c) emulsifying the treatment mixture and increasing the surface area of the organic phase, forming an emulsified mixture;

(d) passing the emulsified mixture into a liquid phase reaction vessel wherein said oxidant reacts with said organic phase to produce said $CO_2$ and said $H_2O$ and a reduced form of said oxidant; and (e) flowing said reduced form of said oxidant through said electrochemical cell and electrochemically regenerating said reduced form of said oxidant to the original oxidant state.

2. The method as recited in claim 1, wherein said organic materials are exoenergetic materials.

3. The method as recited in claim 2, wherein said exoenergetic materials are selected from the group consisting of chemical warfare agents and high explosives.

4. The method as recited in claim 1, wherein said operating temperature is from about 80° C. to about 100° C. in said liquid phase reaction vessel.

5. The method as recited in claim 4, wherein the operating temperature is maintained by a heat exchanger removing thermal energy from the catholyte.

6. The method as recited in claim 1, wherein the oxidant is cerium IV.

7. The method as recited in claim 6, wherein the concentration of cerium IV is from about 1.0M to about 1.7M.

8. The method as recited in claim 1, wherein the electrical current is at least about 4 kWh/lb of the organic materials.

9. The method as recited in claim 1, the step of agitating comprises:
   passing the organic materials through an ultrasonic mixer.

10. The method as recited in claim 4, wherein the temperature of the catholyte is from about 25° C. to about 100° C.

11. The method as recited in claim 1, further comprising a gas phase reaction vessel for receiving a gaseous phase organic material and reacting it with said oxidant.

12. An apparatus for destroying an organic phase within an aqueous solution, comprising:
   (a) an electrochemical cell having a cathode compartment and an anode compartment separated by a porous membrane;
   (b) cerium and an acid selected from the group consisting of nitric acid and sulfuric acid in an anolyte within said anode compartment, said cerium present in a concentration of at least about 0.5 M;
   (c) an agitating emulsifier that increases the surface area of the organic phase; and
   (d) a liquid phase reaction vessel for reacting said organic phase with said cerium and a liquid return to the electrochemical cell for regenerating the reacted cerium.

13. The apparatus as recited in claim 12, further comprising:
   a heater for raising a temperature of the liquid phase reaction vessel.

14. The apparatus as recited in claim 13, wherein said heater has an operating temperature from about 30° C. to about 100° C.

15. The apparatus as recited in claim 13, wherein the concentration of cerium is from about 1.5M to about 1.7M.

16. The apparatus as recited in claim 13, wherein said agitating emulsifier is an ultrasonic mixer which mixes the organic materials in advance of the electrochemical cell.

17. The apparatus as recited in claim 13, wherein the heater is the electrode(s) of the electrochemical cell.

18. The apparatus as recited in claim 17, further comprising a heat exchanger for cooling a catholyte.

19. The apparatus as recited in claim 12, further comprising a gas phase reaction vessel for reacting gaseous phase organic compound.

20. An apparatus for destroying organic materials, comprising:
   (a) an electrolyte solution having an acid selected from the group consisting of nitric acid and sulfuric acid, with an oxidant;
   (b) an ultrasonic mixer for mixing the organic materials with the electrolyte solution into a reactive mixture;
   (c) a liquid phase reaction vessel receiving the reactive mixture wherein the organic materials with the electrolyte solution oxidizes said organic materials to $CO_2$ and $H_2O$ and reduces the oxidant; and
   (d) an electrochemical cell having a cathode compartment and an anode compartment separated by a porous membrane wherein the reduced oxidant is regenerated to an original oxidant state.

21. A method of destroying a treatment mixture of a gaseous organic phase, wherein said gaseous organic phase is converted to $CO_2$ and $H_2O$, comprising the steps of:
   (a) providing an electrochemical cell having a cathode compartment with catholyte and an anode compartment separated by a porous membrane;
   (b) providing an electrolyte solution of an acid selected from the group consisting of nitric acid and sulfuric acid with an oxidant in an original oxidant state that is substantially non-reactive with the aqueous solution at an operating temperature above about 70° C. in an anolyte within said anode compartment;
   (c) passing said gaseous organic phase into a gas phase reaction vessel;
   (d) passing the electrolyte solution into the gas phase reaction vessel wherein said oxidant reacts with said gaseous organic phase to produce said $CO_2$ and said $H_2O$ and a reduced form of said oxidant; and
   (e) flowing said reduced form of said oxidant through said electrochemical cell and electrochemically regenerating said reduced form of said oxidant to the original oxidant state.

22. The method as recited in claim 21, wherein said organic materials are exoenergetic materials.

23. The method as recited in claim 22, wherein said exoenergetic materials are selected from the group consisting of chemical warfare agents and high explosives.

24. The method as recited in claim 21, wherein said operating temperature is from about 80° C. to about 100° C. in said reaction vessel.

25. The method as recited in claim 24, wherein the operating temperature is maintained by a heat exchanger for the catholyte.

26. The method as recited in claim 21, wherein the oxidant is cerium IV.

27. The method as recited in claim 26, wherein the concentration of cerium IV is from about 1.0M to about 1.7M.

28. The method as recited in claim 21, wherein the electrical current is at least about 4 kWh/lb of the organic materials.

29. The method as recited in claim 25, wherein the temperature of the catholyte is from about 25° C. to about 100° C.

30. The method as recited in claim 21, further comprising:
   a liquid organic reaction tank with an emulsifier for mixing a liquid organic compound with said electrolyte solution.

31. An apparatus for destroying a gaseous organic phase, comprising:
   (a) an electrochemical cell having a cathode compartment and an anode compartment separated by a porous membrane;

(b) cerium and an acid selected from the group consisting of nitric acid and sulfuric acid in an anolyte within said anode compartment, said cerium present in a concentration of at least about 0.5 M; and (d) a gas phase reaction vessel for reacting said gaseous organic phase with said cerium and a liquid return to the electrochemical cell for regenerating the reacted cerium.

32. The apparatus as recited in claim 31, further comprising:

a heater for raising a temperature of the gas phase reaction vessel.

33. The apparatus as recited in claim 32, wherein said heater has an operating temperature is from about 30° C. to about 100° C.

34. The apparatus as recited in claim 31, wherein the concentration of cerium is from about 1.5M to about 1.7M.

35. The apparatus as recited in claim 32, wherein the heater is electrode(s) of the electrochemical cell.

36. The apparatus as recited in claim 35, further comprising a heat exchanger for cooling a catholyte.

37. The apparatus as recited in claim 31, further comprising a liquid phase reaction vessel and an agitating emulsifier for mixing a liquid phase organic material with said cerium and reacting same.

38. An apparatus for destroying organic materials, comprising:

(a) an electrolyte solution having an acid selected from the group consisting of nitric acid and sulfuric acid, with an oxidant;

(b) an agitating emulsifier for mixing a liquid organic material with the electrolyte solution into a mixture;

(c) a liquid phase reaction vessel receiving the mixture wherein the mixture is heated and oxidizes said liquid organic material to $CO_2$ and $H_2O$ and reduces the oxidant;

(d) a gas phase reaction vessel for receiving a gaseous organic material and the electrolyte solution wherein the gaseous organic material contacts the electrolyte solution and oxidizes said gaseous organic material to $CO_2$ and $H_2O$ and reduces the oxidant;

(e) an electrochemical cell having a cathode compartment and an anode compartment separated by a porous membrane wherein the reduced oxidant is regenerated to an original oxidant state.

39. A method of destroying a treatment mixture of an organic phase in an aqueous solution, wherein said organic phase is converted to $CO_2$ and $H_2O$, comprising the steps of:

(a) providing an electrochemical cell having a cathode loop with a catholyte and an anode loop separated by a porous membrane;

(b) providing an electrolyte solution of an acid selected from the group consisting of nitric acid and sulfuric acid with an oxidant in an original oxidant state that is substantially non-reactive with the aqueous solution at an operating temperature above about 70° C. in an anolyte within said anode loop;

(c) emulsifying the treatment mixture and increasing the surface area of the organic phase; and (d) flowing electrical current through said electrochemical cell and both heating said aqueous solution as a result of passing electrical current through the electrochemical cell and oxidizing said organic phase in said anode loop.

40. The method as recited in claim 39, wherein said oxidizing in step (d), comprises:

passing the emulsified mixture from step (c) into a liquid phase reaction vessel wherein said oxidant reacts with said organic phase to produce said $CO_2$ and said $H_2O$ and a reduced form of said oxidant.

41. The method as recited in claim 40, wherein said flowing of electrical current is combined with flowing said reduced form of said oxidant through said electrochemical cell and electrochemically regenerating said reduced form of said oxidant to the original oxidant state.

42. The method as recited in claim 39, further comprising the steps of:

passing a gaseous organic phase into a gas phase reaction vessel;

passing the electrolyte solution into the gas phase reaction vessel wherein said oxidant reacts with said gaseous organic phase to produce said $CO_2$ and said $H_2O$ and a reduced form of said oxidant; and flowing said reduced form of said oxidant through said electrochemical cell and electrochemically regenerating said reduced form of said oxidant to the original oxidant state.

* * * * *